Patented Nov. 2, 1926.

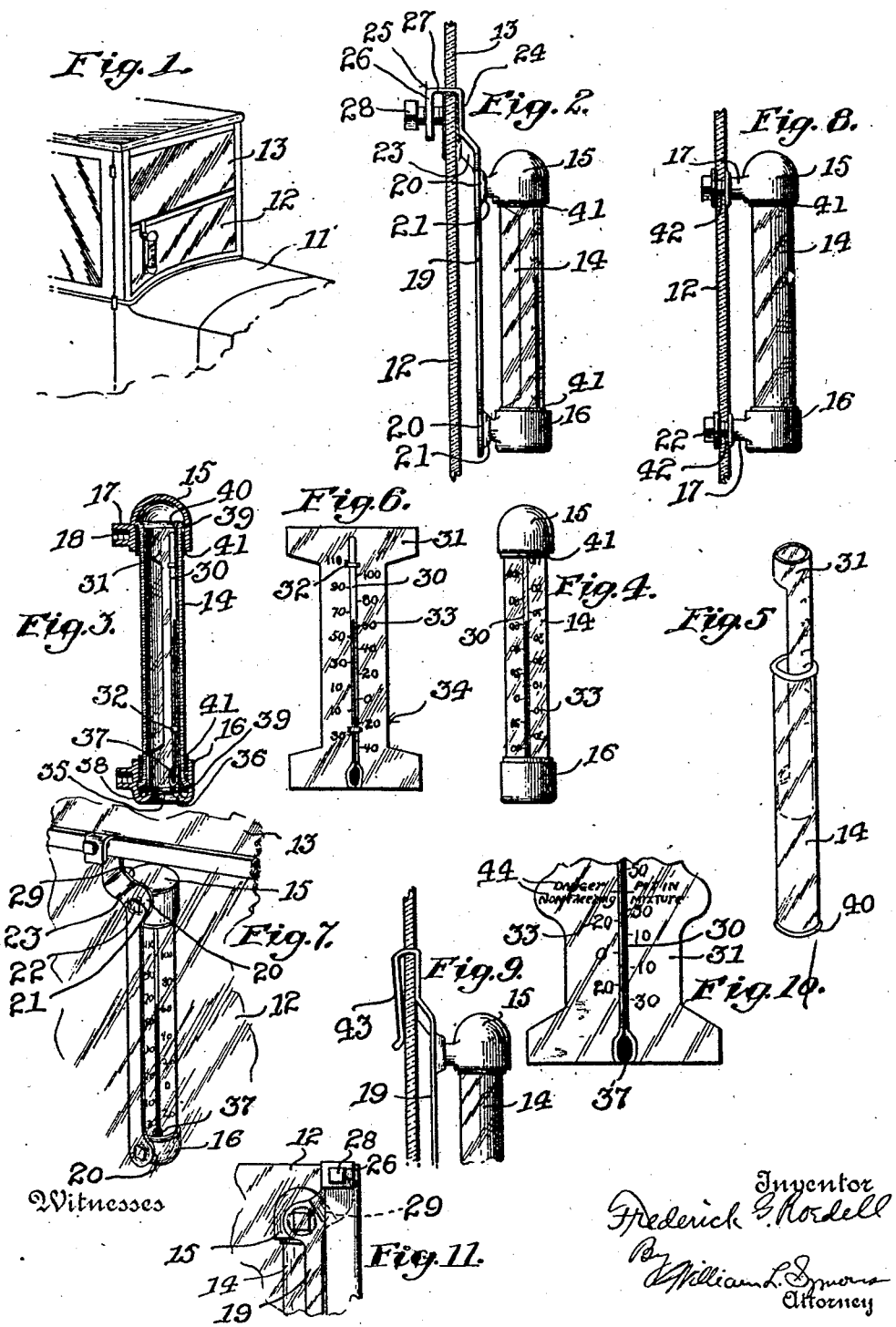

1,605,466

UNITED STATES PATENT OFFICE.

FREDERICK G. ROEDELL, OF DUBUQUE, IOWA, ASSIGNOR OF ONE-HALF TO ROBERT P. ROEDELL, OF DUBUQUE, IOWA.

THERMOMETER.

Application filed March 8, 1924. Serial No. 697,762.

My invention relates to improvements in thermometers and more particularly to that type of thermometer which is adapted to be applied to automobiles, aeroplanes and other means of conveyance.

An important object of the invention is the provision of a device of the above mentioned character which can be readily mounted upon the windshield or framework of an automobile or on appropriate parts of other means of conveyance, and which when located on a closed type of car, will be incapable of removal from without.

Another object of the invention is to provide a device of this character which is capable of adjustment so as to be viewed from different angles.

A further object of the invention is to provide a device of the above mentioned character which will be protected from the weather but will give the temperature of the air on the outside of the vehicle.

Another object of the invention is the provision of a device of this character which will be simple of construction, easy to manufacture, strong and durable.

Other objects and advantages of my invention will be apparent during the course of the following description.

In the accompanying drawings, which form a part of this specification and in which like numerals are employed to designate like parts throughout the same:

Figure 1 is a fragmentary perspective view of a car equipped with my improved thermometer, Figure 2 is a side elevation of the thermometer showing the method of attaching it to an automobile windshield, Figure 3 is a transverse sectional view through the same, Figure 4 is a front elevation of the same, Figure 5 is a detail perspective view of the thermometer holder and casing, showing the method of assembling, Figure 6 is an elevation of the holding or supporting member, before assembling, and showing the method of attaching the thermometer thereto.

Figure 7 is a perspective view looking through the windshield at the thermometer, Figure 8 is an elevation of a modified form of the invention, Figure 9 is a fragmentary elevation of another modification, Figure 10 is a fragmentary elevation of a modified form of holder or support, and Figure 11 is a fragmentary view showing a method of attaching the device to a car.

In the drawings, wherein for the purpose of illustration is shown a preferred embodiment of my invention, the numeral 11 designates an automobile having a lower windshield section 12 and upper section 13. The preferably cylindrical glass casing 14 is supported within an upper cap 15 and a lower cap 16 which have extensions 17 provided with tapped sockets, 18. A supporting arm 19 has lateral extensions 20 provided with depressions 21 which have openings to receive bolts 22 which are adapted to screw into the sockets 18 and clamp the caps 15 and 16 to the supporting arm 19. This supporting arm is offset at 23 and the offset portion 24 thus formed is adapted to fit against the windshield or framework of a car and the arm 19 will be spaced therefrom, thereby preventing rattling and the like. The offset arm 24 is bent upon itself to form a substantially inverted U-shaped clamp 25, the arm 26 of said clamp being arranged on the inside of the car and the upper portion 27 of the clamp is shown as resting upon the top edge of the lower windshield section 12. The arm 26 carries a set screw 28 which clamps the device to the windshield or framework. The supporting arm 19 is also offset laterally as at 29 so that the device may be clamped to the side frame of the windshield and be visible from within the car, as illustrated in Figure 11.

The thermometer tube 30 is attached to the transparent support 31, preferably celluloid, at 32. This support has a scale 33 marked thereon which is adapted to be read from the side to which the thermometer 30 is attached, and has its side portions cut away at 34. In assembling, the transparent thermometer support 31 is bent upon itself into a cylindrical formation and slipped within the glass tube 14, see Figure 5, and the support will conform to the shape of the tube and be held from displacement by frictional engagement with the walls of the tube. In this position, the thermometer will be arranged at the front portion of the tube, and the cutaway portion 34 will be arranged at the rear portions of the tube. The thermometer is adapted to be read from the rear of the tube, and a clear view of the thermometer will be had by reason of the cut-away portions 34 of the support 31.

The lower cap 16 has an opening 35 in its bottom wall 36 which is bent inwardly, and this opening is arranged adjacent the thermometer bulb 37. A strip of felt 38 or the like is arranged in the lower portion of the cap 16 to support the thermometer tube, and the side walls of the caps 15 and 16 may be grooved at 39 to receive the beaded ends 40 of the glass tube 14. Rubber washers 41 are inserted between the glass casing and the caps which will protect the casing and prevent rattling. This construction is such that the glass casing may be rotated with respect to the caps 15 and 16 so that the thermometer may be read from different angles.

In the modification shown in Figure 8, the supporting arm 19 is dispensed with, the bolts 22 are arranged in openings 42 bored in the glass of the windshield, and the thermometer casing is bolted directly to the windshield.

In the modification shown in Figure 9 the set screw 28 is dispensed with and instead of the clamp 25, a spring clasp 43 is utilized to attach the thermometer casing to the windshield.

Figure 10 shows a variation of the supporting scale member 31 and a warning signal 44 is shown which will put the driver on notice that a non-freezing mixture is needed in the radiator.

When this device is attached to the windshield of a car, it will be located on the outside of the car but will be visible from within the car. The atmosphere will reach the bulb 37 through the opening 35, but the inside of the casing will be otherwise protected from the weather, as the cap 15 is closed. The car may be washed without damage to the inside of the casing, and yet the construction is such that the proper temperature of the outside air is obtained.

The set screw is arranged on the inside of the windshield and when applied to a closed car the device cannot be removed from the outside, thereby rendering the device theft proof. The supporting arm 19 is arranged at one side of the center of the casing, by reason of the projections 20, and will therefore not interfere with the clear view of the thermometer from within the car. The casing may be rotated so as to give a better view from a different angle when desired.

It will be seen that this device may be attached to any part of the framework of the car or may even be arranged on the inside if desired, and that any warning signals may be marked on the scale 33.

It will be understood that the form of my invention herewith shown and described is to be taken as a preferred example of the same, and that various changes in the shape, size and arrangement of parts without departing from the spirit of my invention and the scope of the subjoined claims may be resorted to.

Having described my invention what I claim as new and desire to protect by Letters Patent is:

1. In a device of the character described, a pair of supporting caps, a casing rotatably mounted therein, one of said caps having an opening, a transparent scale member frictionally held within said casing and adapted to conform to its shape, a thermometer carried by said scale member and having its bulb located adjacent the opening in the cap, and a supporting arm rigidly secured to the caps and adapted to be clamped to the frame of a vehicle in spaced relation thereto.

2. In a device of the character described a supporting arm adapted to be clamped to the framework of a vehicle in spaced relation thereto, said supporting arm being provided with lateral extensions, supporting caps rigidly secured to the lateral extensions, one of said caps having an opening, a transparent casing mounted within the caps, and a thermometer located within the casing and having its bulb arranged adjacent the opening in the cap.

3. In a device of the character described, a supporting arm having a portion of its length offset, means adapted to be located within a vehicle for clamping the arm thereto, a cap secured to the arm and adapted to be located on the exterior of the vehicle, a cylindrical casing rotatably mounted therein and having its upper end closed, and a thermometer arranged within said casing and having indicia adapted to be read from within the vehicle.

4. In a device of the character described, a supporting arm adapted to be clamped to the framework of an automobile adjacent the windshield, a portion of said arm being in spaced relation to the windshield, the clamping means being arranged within the vehicle, lateral extensions carried by said arm, supporting caps secured to said lateral extensions, one of said caps having an opening therein, a transparent casing rotatably mounted within said cap, a flexible transparent scale member located within the casing and held therein by means of frictional engagement, portions of said scale member being cut away, and a thermometer secured to said scale member and adapted to be read from within the vehicle, the bulb of said thermometer being arranged adjacent the opening in the cap.

5. In a device of the character described, a supporting arm adapted to be clamped to the framework of an automobile adjacent the windshield, the clamping means being arranged within the vehicle, a cap secured to said arm, a transparent casing rotatably mounted therein, and a thermometer arranged within the casing and secured at a point on the wall thereof whereby when the casing is rotated, the location of the thermometer will be changed with respect to the supporting arm, in order to be readily observed from within the vehicle.

6. In a device of the character described, a supporting arm adapted to be clamped to the frame of a vehicle adjacent the windshield thereof, the clamping means being arranged within the vehicle, a cap secured to the supporting arm, a transparent casing mounted therein, a scale member arranged within the casing and adapted to conform to its general shape and being held therein by frictional engagement therewith, a thermometer attached to said scale member, and means whereby the location of the thermometer may be changed with respect to the supporting arm in order to be readily observed from within the vehicle.

In testimony whereof I affix my signature.

FREDERICK G. ROEDELL.